(12) United States Patent
Grokop et al.

(10) Patent No.: US 9,679,252 B2
(45) Date of Patent: Jun. 13, 2017

(54) APPLICATION-CONTROLLED GRANULARITY FOR POWER-EFFICIENT CLASSIFICATION

(71) Applicant: QUALCOMM Incorporated, San Diego, CA (US)

(72) Inventors: Leonard Henry Grokop, San Diego, CA (US); Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 13/835,596

(22) Filed: Mar. 15, 2013

(65) Prior Publication Data

US 2014/0279786 A1 Sep. 18, 2014

(51) Int. Cl.
  *G06N 7/00* (2006.01)
  *G06F 1/32* (2006.01)
  *H04M 1/725* (2006.01)

(52) U.S. Cl.
  CPC ........... *G06N 7/005* (2013.01); *G06F 1/3234* (2013.01); *H04M 1/72569* (2013.01); *Y02B 60/50* (2013.01)

(58) Field of Classification Search
  None
  See application file for complete search history.

(56) References Cited

U.S. PATENT DOCUMENTS

| | | | |
|---|---|---|---|
| 6,115,702 A | 9/2000 | Reiser et al. | |
| 6,594,313 B1 | 7/2003 | Hazra et al. | |
| 7,203,635 B2 | 4/2007 | Oliver et al. | |
| 7,580,974 B2 | 8/2009 | Wei et al. | |
| 8,228,234 B2 | 7/2012 | Paulson et al. | |
| 2002/0138492 A1* | 9/2002 | Kil | G06K 9/6253 |

(Continued)

FOREIGN PATENT DOCUMENTS

WO  2006124795 A2  11/2006

OTHER PUBLICATIONS

Haghighi et alia. Context-Aware Adaptive Data Stream Mining. Intelligent Data Analysis—Knowledge Discovery from Data Streams vol. 13 Issue 3, Aug. 2009 pp. 423-434.*

(Continued)

*Primary Examiner* — Stanley K Hill
*Assistant Examiner* — Robert Bejcek, II
(74) *Attorney, Agent, or Firm* — Hunter Clark PLLC

(57) ABSTRACT

Systems and methods for providing application-controlled, power-efficient context (state) classification are described herein. An apparatus for performing context classification with adjustable granularity as described herein includes a classifier controller configured to receive a request for a context classification and a granularity input associated with the request; and a context classifier communicatively coupled to the classifier controller and configured to receive the request and the granularity input from the classifier controller, to select a resource usage level for the context classification based on the granularity input, wherein a granularity input indicating a higher granularity level is associated with a higher resource usage level and a granularity input indicating a lower granularity level is associated with a lower resource usage level, and to perform the context classification at the selected resource usage level.

55 Claims, 12 Drawing Sheets

(56) References Cited

U.S. PATENT DOCUMENTS

| | | |
|---|---|---|
| 2008/0235318 A1 | 9/2008 | Khosla et al. |
| 2010/0280827 A1 | 11/2010 | Mukerjee et al. |
| 2010/0331017 A1 | 12/2010 | Ariga |
| 2011/0225043 A1 | 9/2011 | Bhatia et al. |
| 2011/0310005 A1 | 12/2011 | Chen et al. |
| 2012/0252490 A1 | 10/2012 | Hernacki et al. |

OTHER PUBLICATIONS

Kang et alia. SeeMon: Scalable and Energy-efficient Context Monitoring Framework for Sensor-rich Mobile Environments. MobiSys'08, Jun. 17-20, 2008.*

Wishart et alia. Context Obfuscation for Privacy via Ontological Descriptions. LoCA 2005, LNCS 3479, pp. 276-288, 2005.*

International Search Report and Written Opinion—PCT/US2014/017236—ISA/EPO—Apr. 22, 2014.

Wang Y., et al., "A framework of energy efficient mobile sensing for automatic user state recognition", Proceedings of the 7th International Conference on Mobile Systems, Applications, and Services, MOBISYS 109, Jun. 22, 2009 (Jun. 22, 2009),-Jun. 25, 2009 (Jun. 25, 2009), pp. 179-192, XP055017031, New York, New York, USA DOI: 10.1145/1555816.1555835, ISBN: 978-1-60-558566-6.

International Preliminary Report on Patentability—PCT/US2014/017236, European Patent Office, Rijswijk—Pays Bas, The Netherlands, Jun. 1, 2015, 22 pgs.

Second Written Opinion from the International Preliminary Examining Authority for Application No. PCT/US2014/017236, dated Jan. 29, 2015, 9 Pages.

Taiwan Search Report—TW103108226—TIPO—Sep. 3, 2015.

* cited by examiner

APPLICATION-CONTROLLED GRANULARITY FOR POWER-EFFICIENT CLASSIFICATION

BACKGROUND

Implementations of the method may include one or more of the following features. Obtaining a result of the context classification from the classifier; and forwarding the result to an entity from which the request was received. The resource usage level for the context classification is related to at least one of a number of sensor features utilized, classification technique employed, duty cycle of the classifier, or parameters associated with the classification technique employed. The granularity input is selected from a predefined set of granularity settings. Identifying subsets of available outputs for the context classification; and assigning granularity levels to respective ones of the subsets of available outputs. Receiving a granularity input comprising one of the subsets of available outputs for the context classification; and causing the classifier to perform the context classification by selecting an output from the subset of available outputs received as the granularity input at the resource usage level assigned to the granularity level. The context classification includes one or more of a motion state classification, a location state classification, or an audio state classification. Receiving, at an application programming interface (API), the request for the context classification from a requesting application.

SUMMARY

One approach to inferring user contexts is to learn them, statistically or otherwise, from computed low-level inferences and features. Examples of low-level inferences are whether or not speech is present in an audio data stream, the motion state (walking, sitting, driving, etc.) of a user as determined based on an accelerometer data stream, whether the user is at home/work/in transit/at an unknown location, whether the user is indoors or outdoors (e.g., based on the number of Global Positioning System (GPS) or other SPS satellites visible), etc. Examples of low-level features are GPS velocity, number of Bluetooth™ devices within range, number of Wi-Fi access points visible, proximity sensor count, ambient light level, average camera intensity, time of day, day of week, weekday or weekend, ambient audio energy level, etc. The above is not an exhaustive list, and other low-level features and/or inferences could be used.

The techniques described herein can be utilized for a mobile device, such as the example mobile device 100 illustrated in FIG. 1. The mobile device 100 includes a wireless transceiver 121 that sends and receives wireless signals 123 via a wireless antenna 122 over a wireless network. The transceiver 121 is connected to a bus 101 by a wireless transceiver bus interface 120. While shown as distinct components in FIG. 1, the wireless transceiver bus interface 120 may also be a part of the wireless transceiver 121. Here, the mobile device 100 is illustrated as having a single wireless transceiver 121. However, a mobile device 100 can alternatively have multiple wireless transceivers 121 and wireless antennas 122 to support multiple communication standards such as Wi-Fi, Code Division Multiple Access (CDMA), Wideband CDMA (WCDMA), Long Term Evolution (LTE), Bluetooth™, etc.

Here, the API 610 is an interface that is available to applications 620 executing on an associated device. The API may be built into a device operating system, such as the Android™ operating system developed by Google, Inc., the Windows™ and Windows Mobile™ operating systems developed by Microsoft Corp., and/or any other operating systems, whether presently existing or existing in the future. For instance, the API 610 may be built into a device operating system as part of a carrier-or vendor-specific extension package to the operating system. Alternatively, the API 610 may be implemented as a standalone software component that is independent of the device operating system, provided that the API 610 has sufficient access privileges to convey requests and classification outputs between the requesting applications 620 and the classifier 630. For any of the above implementations, the API 610 may be incorporated by a mobile device prior to distribution of the device or subsequent to distribution (i.e., in the form of software patches or updates).

Bluetooth™ (BT) fingerprints: Includes sets of visible Bluetooth™ devices, their respective signal strengths (e.g., given as RSSI), their device classes, and their respective response rates.

Additionally, the context classifier 230 performs context classification based on low-level features and inferences obtained via the data sources 210. A list of possible low-level features that can be computed from device sensor data or external sources (such as the data sources 210) includes, but is not limited to, the following:

GPS velocity, accuracy, altitude
GPS satellites visible
Time of day, day of week, weekday/weekend, public holiday
Weather, temperature
Ambient light sensor readings
Proximity sensor readings
Camera data, intensity, R/G/B intensity, features such as DCT (discrete cosine transform) coefficients, object(s) detected in camera field of view
Closest geographic points of interest (POIs)
Bluetooth™ devices visible and corresponding RSSIs, new/old Bluetooth™ devices within range
Wi-Fi APs visible and corresponding RSSIs, new/old Wi-Fi APs visible
Ambient audio energy level
Movement detection (any device movement vs. no device movement)

Common forms of physical and/or tangible computer-readable media include, for example, a floppy disk, a flexible disk, hard disk, magnetic tape, or any other magnetic medium, a CD-ROM, a Blu-ray™ disc, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Implementations of the apparatus may additionally or alternatively include one or more of the following features. The granularity input includes a subset of available outputs for the context classification. The context classifier is further configured to assign the subset of the available outputs received as the granularity input to a classifier granularity configuration, the classifier granularity configuration defining the selected resource usage level. The context classifier is further configured to perform the context classification by selecting an output from the subset of available outputs received as the granularity input. The context classifier includes one or more of a motion state classifier, a location state classifier, or an audio state classifier. The classifier controller includes an API and is further configured to receive the request for the context classification from a requesting application. The context classifier is further configured to provide a result of the context classification to at least one of the API or the requesting application. One or more data sources communicatively coupled to the context classifier, where the context classifier is configured to perform the context classification based on data sampled from the data sources. The data sources include at least one of an audio sensor, a location sensor, a network sensor, a motion sensor, a calendar, a clock, a set of device usage statistics, or a light sensor.

An example of an apparatus for managing a context classification as described herein includes means for receiving a request for the context classification and a granularity input associated with the request; and means for causing a classifier to perform the context classification in response to the request at a resource usage level related to the granularity input. A granularity input indicating a higher granularity level is associated with a higher resource usage level, and a granularity input indicating a lower granularity level is associated with a lower resource usage level.

Implementations of the apparatus may include one or more of the following features. The resource usage level for the context classification is related to at least one of number of sensor features utilized, classification technique employed, duty cycle of the classifier, or parameters associated with the classification technique employed. The granularity input is selected from a predefined set of granularity settings. The granularity input includes a subset of available outputs for the context classification. The context classification includes one or more of a motion state classification, a location state classification, or an audio state classification.

An example of an apparatus for performing a context classification with adjustable granularity as described herein includes means for receiving a request for the context classification and a granularity input associated with the request; means for selecting a resource usage level for the context classification based on the granularity input; and means for performing the context classification at the selected resource usage level. A granularity input indicating a higher granularity level is associated with a higher resource usage level, and a granularity input indicating a lower granularity level is associated with a lower resource usage level.

Implementations of the apparatus may include one or more of the following features. The resource usage level is related to at least one of number of sensor features utilized, classification technique employed, frequency of classification, or parameters associated with the classification technique employed. The granularity input is selected from a predefined set of granularity settings. The granularity input includes a subset of available outputs for the context classification. The context classification includes one or more of a motion state classification, a location state classification, or an audio state classification. Means for returning a result of the context classification to a source of the request for the context classification.

An example of a computer program product as described herein resides on a processor-executable computer storage medium and includes processor-executable instructions configured to cause a processor to receive a request for the context classification and a granularity input associated with the request; and to cause a classifier to perform the context classification in response to the request at a resource usage level related to the granularity input. A granularity input indicating a higher granularity level is associated with a higher resource usage level, and a granularity input indicating a lower granularity level is associated with a lower resource usage level.

Implementations of the computer program product may include one or more of the following features. The resource usage level for the context classification is related to at least one of number of sensor features utilized, classification technique employed, duty cycle of the classifier, or parameters associated with the classification technique employed. The granularity input is selected from a predefined set of granularity settings. The granularity input includes a subset of available outputs for the context classification.

Another example of a computer program product as described herein resides on a processor-executable computer storage medium and includes processor-executable instructions configured to cause a processor to receive a request for a context classification and a granularity input associated with the request; to select a resource usage level for the context classification based on the granularity input; and to perform the context classification at the selected resource usage level. A granularity input indicating a higher granularity level is associated with a higher resource usage level and a granularity input indicating a lower granularity level is associated with a lower resource usage level.

Implementations of the computer program product may include one or more of the following features. The resource usage level is related to at least one of number of sensor features utilized, classification technique employed, frequency of classification, or parameters associated with the classification technique employed. The granularity input is selected from a predefined set of granularity settings. The granularity input includes a subset of available outputs for the context classification. Instructions configured to cause the processor to return a result of the context classification to a source of the request for the context classification.

Items and/or techniques described herein may provide one or more of the following capabilities, as well as other capabilities not mentioned. Mechanisms herein provide for adjustable classifier precision, enabling conservation of power consumption and resource usage for applications where high classification precision is not needed. An application programming interface (API) and/or other control mechanisms are provided, which provide simplified, uniform procedures for access to state or context classification routines by applications executing on a device. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

DETAILED DESCRIPTION

Figure 1:
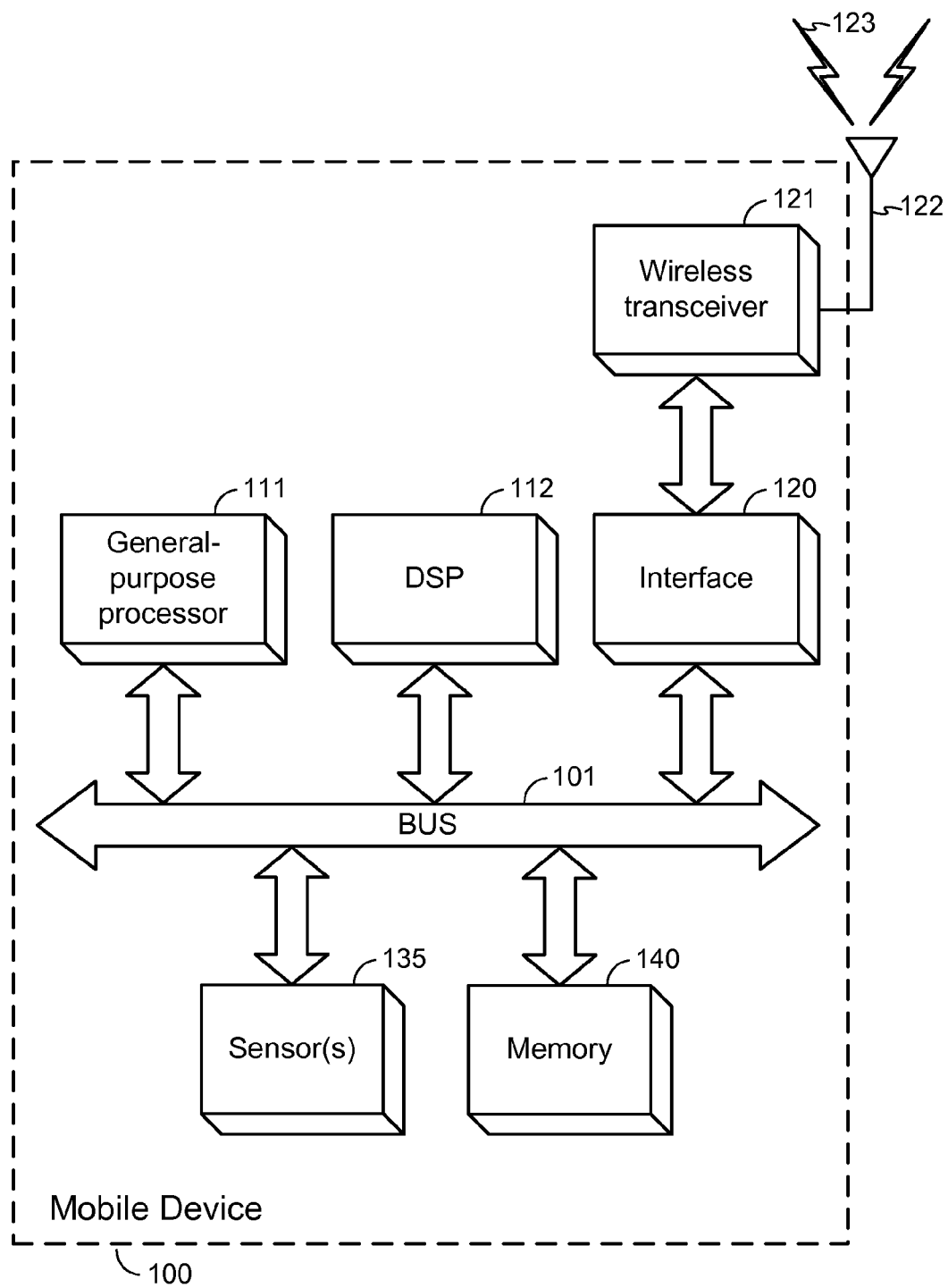
FIG. 1 is a block diagram of components of a mobile computing device.

Described herein are systems and methods for providing application-controlled granularity for context classification. The techniques described herein can be used to aid in context determination for devices such as smartphones, laptop or tablet computers, personal digital assistants (PDAs), etc., as well as any other computing device presently existing or existing in the future. Other uses may also be possible. While various examples given in the description below relate to mobile computing devices, the techniques described herein can be applied to any device for which context inference is desirable.

Advancements in mobile device technology have given mobile devices the ability to detect and use device and user context information, such as the location of a device, events occurring in the area of the device, etc., in performing and customizing functions of the device. One objective of mobile context awareness is to have a device infer what its user is doing. This can be evaluated along multiple dimensions, such as by the type of place the user is located (e.g., office, conference room, lecture hall, home, gym, restaurant, coffee shop, bar, etc.) or the type of situation the user is in (e.g., meeting, working alone, driving, having lunch, working out, sleeping, etc.). Each such dimension is referred to herein as a context. By inferring user contexts, a range of applications are facilitated, such as, but not limited to, the following:

1) Automating device functionality such as diverting calls to voicemail or responding to text messages when the user is uninterruptible, adjusting the ringer volume based on the environment, notifying meeting participants when the user is running late, etc.

2) Automating social networking interaction such as check-ins, notifying friends when the user is nearby, etc.

3) Providing health care information such as calories burned, miles walked, hours spent at work vs. play, etc.

4) Facilitating accurate and timely recommendations such as for restaurants, shops, consumer products, gasoline, etc.

One approach to inferring user contexts is to learn them, statistically or otherwise, from computed low-level inferences and features. Examples of low-level inferences are whether or not speech is present in an audio data stream, the motion state (walking, sitting, driving, etc.) of a user as determined based on an accelerometer data stream, whether the user is at home/work/in transit/at an unknown location, whether the user is indoors or outdoors (e.g., based on the number of Global Positioning System (GPS) or other SPS satellites visible), etc. Examples of low-level features are GPS velocity, number of Bluetooth devices within range, number of Wi-Fi access points visible, proximity sensor count, ambient light level, average camera intensity, time of day, day of week, weekday or weekend, ambient audio energy level, etc. The above is not an exhaustive list, and other low-level features and/or inferences could be used.

As noted above, a mobile device (e.g., a smartphone, etc.) classifies sensor data in the process of providing context-aware services. These classifications can include, e.g., motion state classification based on accelerometer data, speech detection based on audio data, etc. Applications at the original equipment manufacturer (OEM) level and/or at a level above the operating system (OS) of the device utilize the outputs of context aware services through vendor-provided APIs. However, different applications may have different requirements. For example, a motion state classifier may output a set of classes {walk, run, sit, stand, fiddle, rest, drive} through an API, through which a geo-fencing application may in turn utilize for the purposes of determining a motion state from a set {stationary, pedestrian_motion, vehicular_motion} in order to bound the distance moved by the user. Viewed as an end-to-end system, the API in this scenario provides classification outputs that are of a higher granularity than that used by the application, which results in reduced efficiency from a power perspective.

In view of at least the above, systems and methods described herein provide for application-controlled context classification. Applications and/or other entities requesting a context classification are given the ability to specify a desired granularity level according to one or more granularity definition schemes. In doing so, applications are provided with increased ability to manage tradeoffs between desired classification precision and consumption of power and/or other system resources.

The techniques described herein can be utilized for a mobile device, such as the example mobile device 100 illustrated in FIG. 1. The mobile device 100 includes a wireless transceiver 121 that sends and receives wireless signals 123 via a wireless antenna 122 over a wireless network. The transceiver 121 is connected to a bus 101 by a wireless transceiver bus interface 120. While shown as distinct components in FIG. 1, the wireless transceiver bus interface 120 may also be a part of the wireless transceiver 121. Here, the mobile device 100 is illustrated as having a single wireless transceiver 121. However, a mobile device 100 can alternatively have multiple wireless transceivers 121 and wireless antennas 122 to support multiple communication standards such as Wi-Fi, Code Division Multiple Access (CDMA), Wideband CDMA (WCDMA), Long Term Evolution (LTE), Bluetooth, etc.

A general-purpose processor 111, memory 140, digital signal processor (DSP) 112 and/or specialized processor(s) (not shown) may also be utilized to process the wireless signals 123 in whole or in part. Storage of information from the wireless signals 123 is performed using a memory 140 or registers (not shown). While only one general purpose processor 111, DSP 112 and memory 140 are shown in FIG. 1, more than one of any of these components could be used by the mobile device 100. The general purpose processor 111 and DSP 112 are connected to the bus 101, either directly or by a bus interface 110. Additionally, the memory 140 is connected to the bus 101 either directly or by a bus interface (not shown). The bus interfaces 110, when implemented, can be integrated with or independent of the general-purpose processor 111, DSP 112 and/or memory 140 with which they are associated.

The memory 140 includes a non-transitory computer-readable storage medium (or media) that stores functions as one or more instructions or code. Media that can make up the memory 140 include, but are not limited to, RAM, ROM, FLASH, disc drives, etc. Functions stored by the memory 140 are executed by the general-purpose processor 111, specialized processor(s), or DSP 112. Thus, the memory 140 is a processor-readable memory and/or a computer-readable memory that stores software code (programming code, instructions, etc.) configured to cause the processor 111 and/or DSP 112 to perform the functions described. Alternatively, one or more functions of the mobile device 100 may be performed in whole or in part in hardware.

The mobile device 100 further includes one or more sensors 135 that capture data associated with the mobile device 100 and/or its surroundings. The sensors 135 may include, but are not limited to, microphones or audio sensors, cameras, light sensors, pressure sensors, inertial sensors (e.g., accelerometers and/or gyroscopes), magnetometers, etc. The sensors 135 may be used individually or in combinations, such as sensor arrays or any other combinations. Multiple sensors 135, if implemented by the mobile device 100, can operate interdependently or independently of one another. The sensors 135 are connected to the bus 101, either independently or through a bus interface (not shown). For instance, the sensors 135 can communicate with the DSP 112 through the bus 101 in order to process data captured by the sensors 135. The sensors 135 can additionally communicate with the general-purpose processor 111 and/or memory 140 to generate or otherwise obtain metadata associated with captured data. In some embodiments, the antenna 122 and/or transceiver 121 may also be utilized as sensors, for example to sense or detect wireless signals such as Wi-Fi signals.

Figure 2:
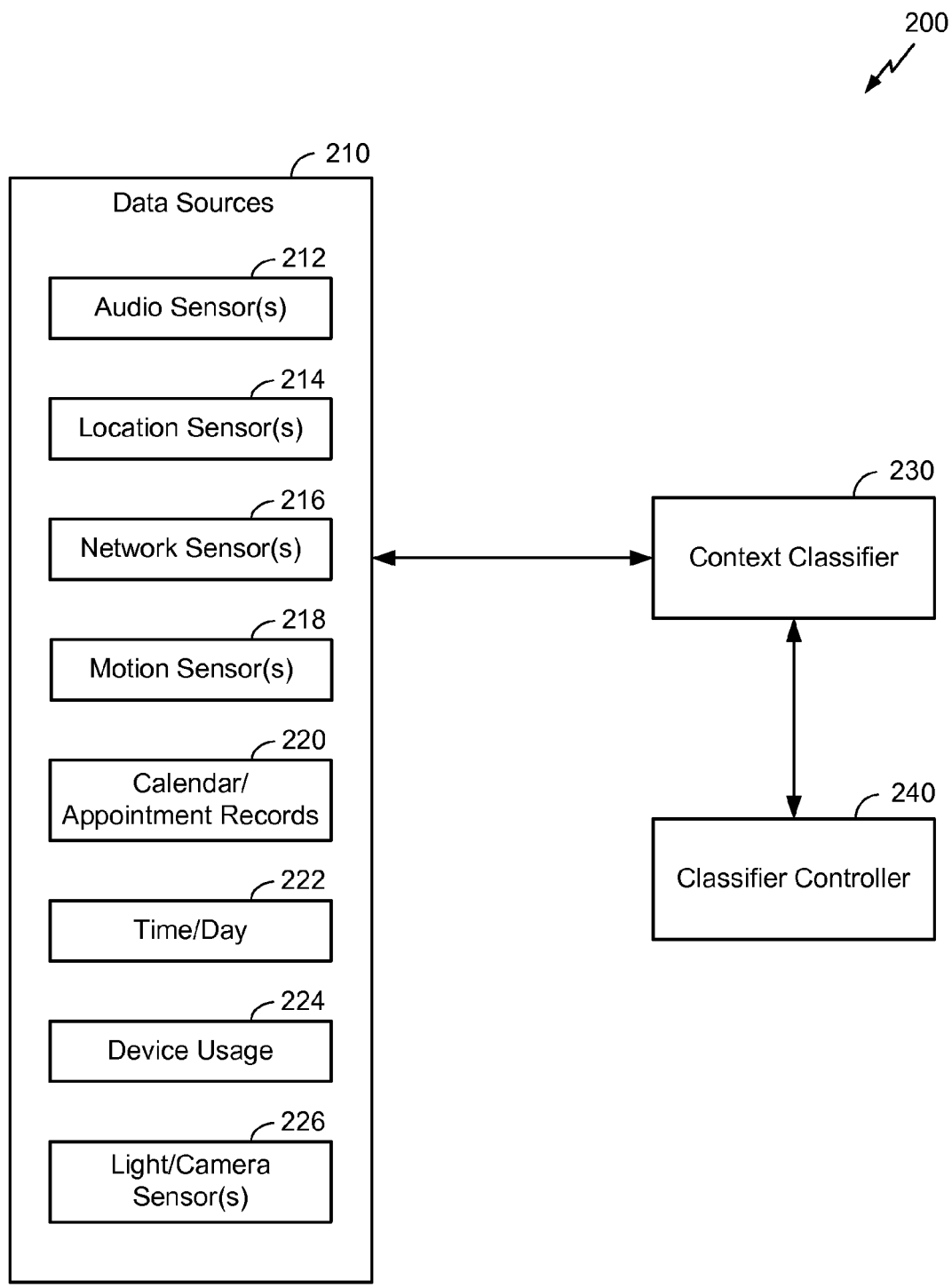
FIG. 2 is a block diagram of a system for performing and managing context classifications.

FIG. 2 illustrates a system 200 for performing and managing context classifications. The system 200 can be utilized by a computing device, such as the mobile device 100 shown in FIG. 1. The system 200 includes one or more data sources 210, which may include, but are not limited to, audio sensors 212 such as microphones, location sensors 214 such as GPS transceivers, network sensors 216 such as Wi-Fi and/or other radio transceivers, motion sensors 218 such as accelerometers or gyroscopes, calendar/appointment records 220, sources of time/day information 222 such as a system clock or other mechanisms, device usage monitors 224, light and/or camera sensors 226, etc.

Data from the data sensors 210 are provided to (e.g., sampled by) a context classifier 230, which utilize the collected data to infer a context state indicated by the data. For instance, the context classifier may be a motion state classifier that utilizes data from the data sensors 210 to infer a motion state associated with the system 200. Other classifications are also possible, as discussed below. The context classifier 230 may perform context classifications periodically and/or in response to requests for classification provided by one or more sources. Techniques for receiving and responding to classification requests are discussed below.

Data collected from the data sources 210 can take any form usable by the context classifier 230. For instance, collected data can include audio samples from the audio sensors 212; GPS readings and/or other positioning measurements from the location sensors 214; network strength and/or other network-related readings from the network sensors 216; motion, acceleration or orientation data from the motion sensors 218; entries associated with a calendar 220; etc. In addition to the data, labels applied to the data can also be utilized. For instance, calendar entries may be labeled with a location or title, e.g., "user's office" or "doctor appointment."

The classifier controller 240 manages the operation of the context classifier 230 by accepting incoming requests for context classification via applications or other sources and configuring the context classifier 240 to perform context classification at a specified granularity level in response to the requests. For instance, as shown by system 300 in FIG. 3, a classification request source 310 (e.g., an application executed by a mobile device 100, etc.) is configured to submit requests for context classification to the classifier controller 240. The classification request includes granularity settings as input, which may take the form of either a granularity parameter or a specified set of subsets of classes, as described below. The classifier controller 240 processes the granularity input and submits appropriate instructions to the context classifier 230 in response to the request and the granularity input. The internal mechanics of the context classifier 230 are reconfigurable to operate at either different granularities of output, or to output different specified sets of subsets of classes, as specified by the instructions from the context classifier 230. As a result, the power required to run the context classifier 230 is reduced when the granularity is coarsened, or when broader subsets of classes are specified. Upon performing a context classification at the specified level of granularity, the output of the classification is provided to the source 310 of the classification request, either directly or via the classifier controller 240. By configuring the classifier controller 240 to act as an intermediary between the context classifier 230 and entities requesting classifications, the classifier controller can provide a simplified, uniform means of interaction between the context classifier 230 and requesting entities, for example via an API and/or other mechanisms, irrespective of an operating system utilized by an associated device and/or other properties of the associated device that may impact operation of the context classifier 230. An example implementation of the classifier controller 240 as an API is discussed in further detail below. Other implementations are also possible.

When a coarser granularity is requested, or a broader subset of classes is specified, the context classifier 230 may compute its output with coarser granularity and/or less precision based on one or more of the following: (1) obtaining and/or using fewer features from data provided by the data sources 210; (2) using a cruder classification technique; (3) using a simpler parameter setting, e.g., fewer mixture components for a Gaussian Mixture Model (GMM), fewer support vectors (for a Neural Network classifier), fewer data points considered for a nearest neighbor classifier; (4) using a lower duty cycle, e.g. only waking the sensor subsystem in short bursts; etc. Other adjustments are also possible.

Figure 4:
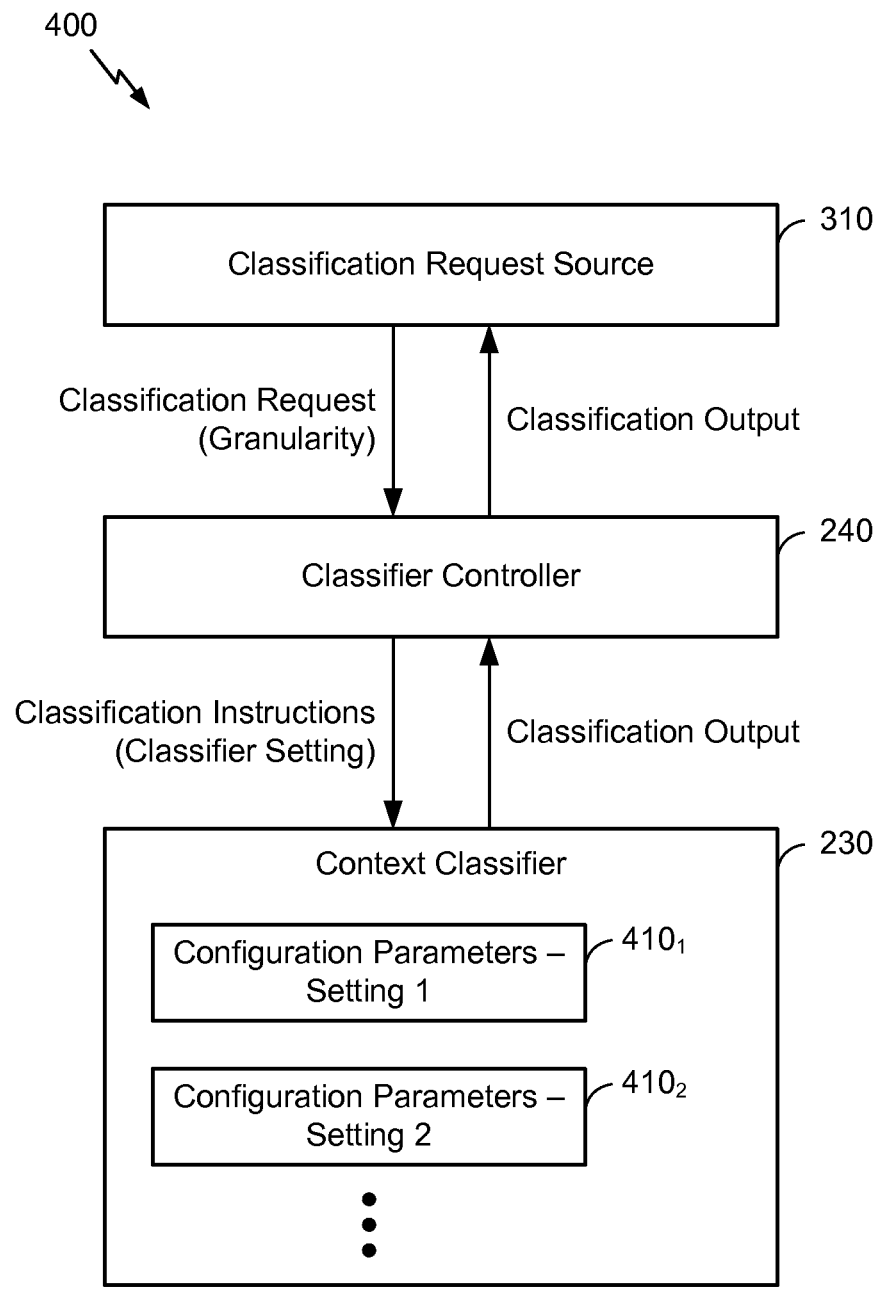

An example of granularity-controlled operation of the context classifier 230 based on a set of granularity settings is shown by system 400 in FIG. 4. Here, the classifier controller 240 is configured to take a granularity parameter as input from a request source 310 in combination with a request for classification. The granularity parameter has one or more settings, each of which are associated with sets of configuration parameters 410 at the context classifier 230. The context classifier 240 receives classification instructions from the classifier controller 240 in response to a classification request, identifies an appropriate set of configuration parameters 410 based on the associated granularity input, performs the requested classification, and returns the result of the classification to the classifier controller 240 and/or the source 310 of the request. Here, the classifier controller 240 is shown as converting the granularity parameter into a classifier setting instruction, and the context classifier 230 utilizes the instructed set of configuration parameters 410 to perform the classification. Alternatively, the classifier controller 240 can pass the granularity parameter to the context classifier 230 with the request, and the context classifier 230 can determine the appropriate set of configuration parameters 410 based on the granularity parameter.

As an example of operation of the system 400, the context classifier 230 may be configured to provide motion state classification according to a granularity parameter with two settings: coarse and fine. Here, the coarse setting results in the context classifier 230 operating as a GMM-based motion state classifier that utilizes the standard deviation of the accelerometer norm (herein referred to as sa) and the ratio of means as features, utilizes one mixture component per feature, and outputs from a first set of states {stationary, pedestrian_motion, vehicular_motion}. In contrast, the fine setting results in the context classifier 230 operating as a motion state classifier that utilizes pitch and roll, several mel-frequency cepstral coefficients (MFCCs), spectral entropy, and the mean of the accelerometer norm in addition to the two features listed above for the coarse setting; utilizes four mixture components per feature; and outputs from a second set of states {walk, run, sit, stand, fiddle, rest, drive}. As the coarse setting will generally result in reduced computation, the context classifier 230 runs at lower power in this setting as compared to the fine setting.

Figure 5:
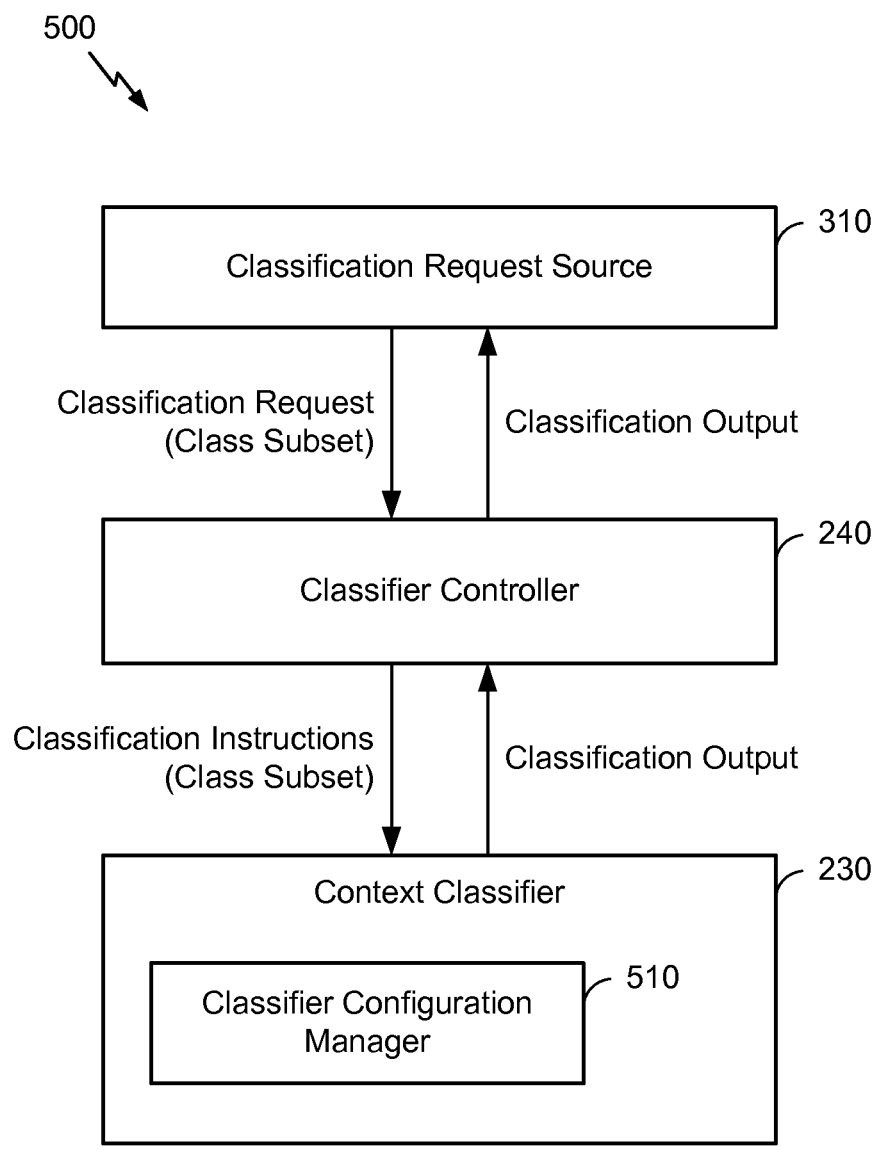

Another example of granularity-controlled operation of the context classifier 230, here based on sets of classifier output subsets, is shown by system 500 in FIG. 5. For each classification type performed by the context classifier 230 and managed by the classifier controller 240 (e.g., motion state classification, location classification, etc.), the context classifier maintains a set of available classification outputs (e.g., context states). This set of available outputs is in turn divided into subsets, and a classifier configuration manager 510 associated with the context classifier 230 associates each subset with a classifier configuration parameters. By way of example, for a classification having possible outputs {A, B, C}, the classifier configuration manager 510 can maintain configuration profiles for subset groups {A/B, C}, {A/C, B}, {B/C, A} and {A, B, C}. Stated another way, for this example, the context classifier is associated with different configurations by which the context classifier 230 outputs either (1) A/B or C, (2) A/C or B, (3) B/C or A, or (4) A or B or C. Similar subset combinations could be utilized for a classification having other numbers of possible outputs. The output subsets associated with a given classification may correspond to all possible combinations of potential outputs or less than all possible combinations. Further, subsets may consist of single potential outputs (e.g., return a given state output A or no state output) or multiple potential outputs. Additionally, some outputs may be combined in various subsets. For instance, returning to the example of a classification having possible outputs {A, B, C} as shown above, the classifier configuration manager 510 may also maintain configuration profiles for subsets {(A or B), C}, {A, (B or C)}, etc. Other configurations could also be used.

As shown in system 500, a source 310 for a classification request submits the request to the classifier controller 230 along with a subset of the available output context classes for the classification. The output subset associated with the classification request represents the subset of available classification outputs from which the context classifier 230 is to select in making its context determination. System 500 illustrates that the classification request source 310 identifies a desired subset of outputs for a given classification and submits this subset to the classifier controller 240 in combination with the request. Alternatively, selection of a classification output subset could be performed by the classifier controller 240 transparently to the classification request source 310. For instance, the classification request source 310 could submit a request for a context classification to the classifier controller with an associated generalized granularity setting. In this case, the classifier controller 240 converts the provided granularity level to a subset of outputs and forwards this output subset to the context classifier 230. Similarly, the classifier controller 240 could forward the granularity level input to the context classifier 230 such that the context classifier 230 could determine an appropriate subset of potential outputs. The classifier controller 240 and/or context classifier 230 may also utilize a default granularity configuration and/or classification output subset in the event that no granularity input is obtained from a classification request source 310 with a classification request.

As an example of operation of the system 500, the classifier controller 240 may take as input from a request source 310 a specified set of subsets of classes. Additionally, the context classifier 230 may include a GMM-based motion state classifier that has a default set of classes {walk, sit, stand}. Thus, the possible inputs for set of subsets of classes are {{walk}, {sit}, {stand}}, {{walk, sit}, {stand}}, {{walk}, {sit, stand}}, {{walk, stand}, {sit}}, and {{walk, sit, stand}}. The context classifier 230 may use different features and number of mixture components depending on the specified set. For example, if the input set specified is {{walk}, {sit, stand}}, the context classifier 230 may use a single feature sa (as defined above) with a single mixture component to classify the data. In some cases, this results in power savings relative to the case where the specified input set is {{walk, sit}, {stand}}, which may utilize more features and mixture components to classify with the same accuracy.

Figure 6:
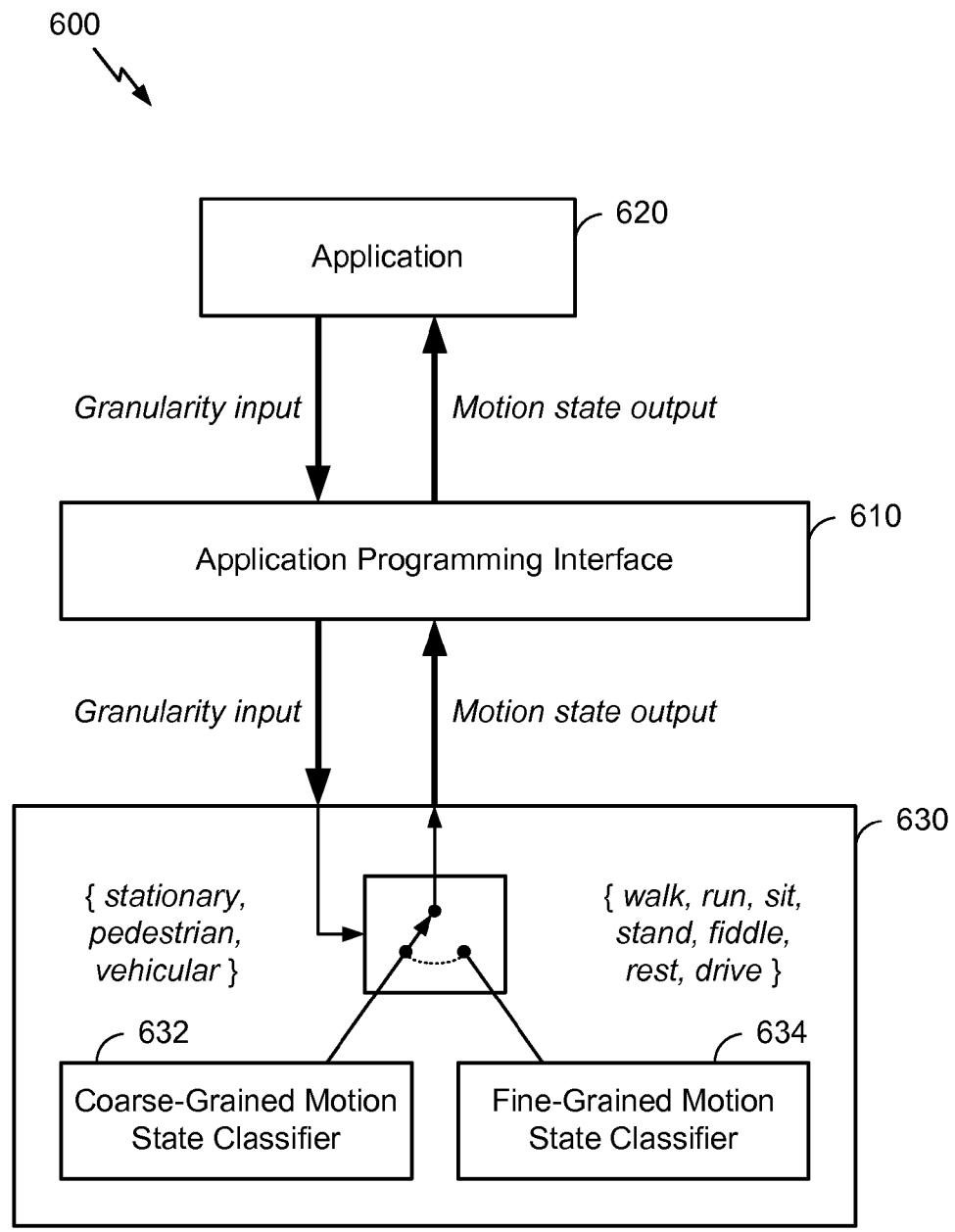
FIG. 6 is block diagram of an application-controlled classification system managed with an API.

The context classifier 230 and/or classifier controller 240 can be implemented in hardware, in software (e.g., software code stored on a non-transitory computer-readable memory 140 and executed by a processor 111), or a combination of hardware and software. An example implementation of a context classification system 600 with application-controlled granularity is shown in FIG. 6. The system 600 shown in FIG. 6 includes an API 610, which interacts with one or more applications 620 and acts as an intermediary between the applications 620 and a motion state classifier 630. While the specific example of a motion state classifier is used in FIG. 6, similar concepts apply to other context classifiers as described above.

Figure 3:
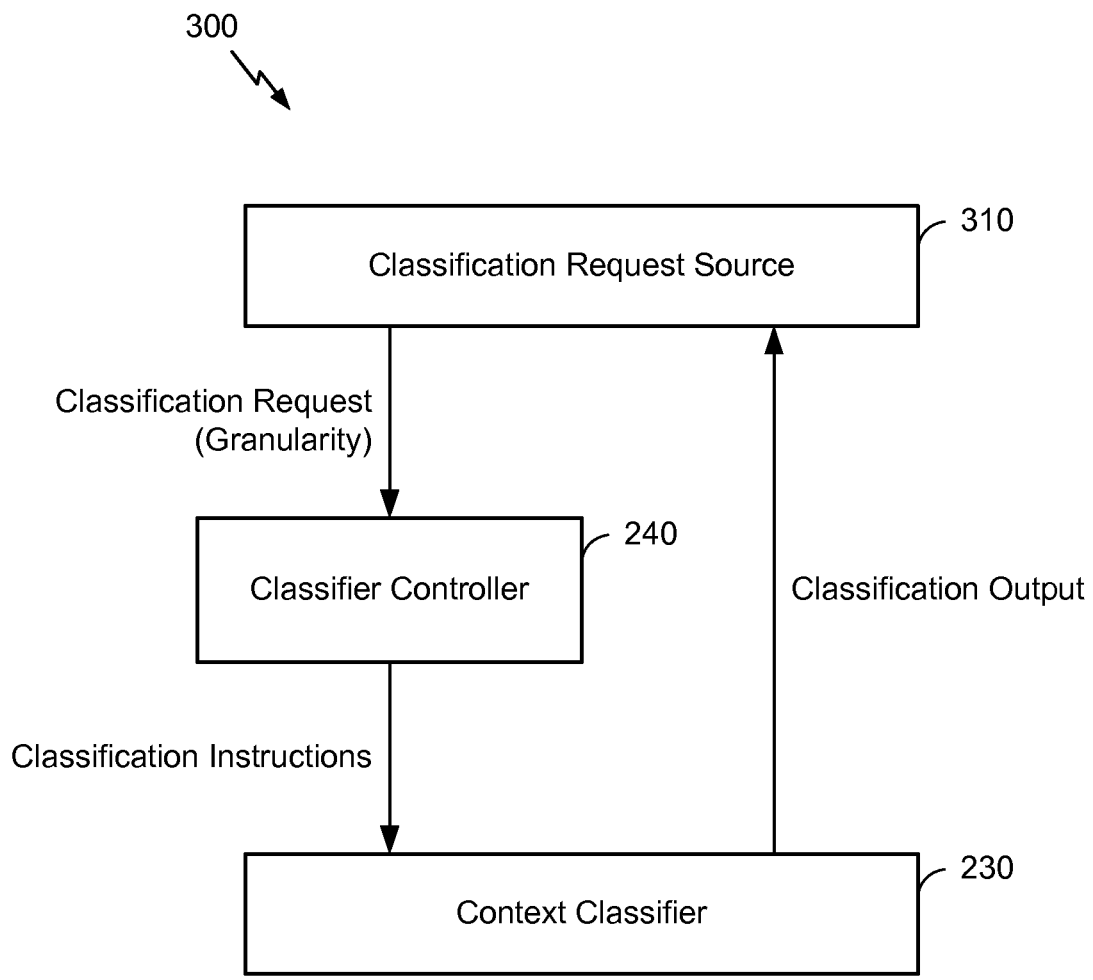
FIGS. 3-5 are block diagrams of respective systems for processing a request for a context classification.

In general, the application 620 shown in system 600 acts in a similar manner to the classification request source 310 shown in FIGS. 3-5 to submit requests for context classification to the API 610. The application 620 includes a granularity input with its request for classification. The API 610 provides this granularity input, and/or other appropriate granularity-specific instructions, to the motion state classifier 630 in a similar manner to the classifier controller 240 shown in FIGS. 3-5. Here, the motion state classifier 630 is configured to utilize two settings: a coarse setting corresponding to the classification output subset {stationary, pedestrian, vehicular} and a fine setting corresponding to the classification output subset {walk, run, sit, stand, fiddle, rest, drive}. Other settings could also be used, as generally described above with respect to FIGS. 2-5.

The setting to be used by the motion state classifier 630 may be selected based on either a granularity setting parameter (e.g., coarse or fine) in a similar manner to system 400, identification of one of the classification output subsets in a similar manner to system 500, and/or a combination of these approaches and/or other approaches. If the coarse setting is chosen, the motion state classifier performs context classification using a coarse-grained motion state classifier 632. Alternatively, a fine-grained motion state classifier 634 is used if the fine setting is chosen. In either case, the resulting motion state from the classification is returned to the API 610 by the motion state classifier 630. The API 610, in turn, provides the output to the requesting application 620.

The coarse-grained motion state classifier 632 and fine-grained motion state classifier 634 may vary in terms of one or more properties such as sensor sample rate and/or classification duty cycle, sensor features utilized, classifier type, or the like. In general, the coarse-grained motion state classifier 632 results in a lower level of power consumption than that of the fine-grained motion state classifier 634 at the cost of classification precision. Thus, the coarse-grained motion state classifier 632 is utilized for applications for which either a finely granular classification output is not needed or power consumption is otherwise determined to be of higher importance than classification granularity, e.g., for low-power devices, applications or operating modes; scenarios where a battery charge level of an associated device is below a designated threshold; etc.

Here, the API 610 is an interface that is available to applications 620 executing on an associated device. The API may be built into a device operating system, such as the Android operating system developed by Google, Inc., the Windows and Windows Mobile operating systems developed by Microsoft Corp., and/or any other operating systems, whether presently existing or existing in the future. For instance, the API 610 may be built into a device operating system as part of a carrier- or vendor-specific extension package to the operating system. Alternatively, the API 610 may be implemented as a standalone software component that is independent of the device operating system, provided that the API 610 has sufficient access privileges to convey requests and classification outputs between the requesting applications 620 and the classifier 630. For any of the above implementations, the API 610 may be incorporated by a mobile device prior to distribution of the device or subsequent to distribution (i.e., in the form of software patches or updates).

The API 610 provides a set of functions and settings for use by applications 620 to utilize the motion state classifier 630 and/or other classifiers associated with a device or computing environment. The functions and/or settings provided by the API 610 can be the same across multiple classifiers or may vary between classifiers (e.g., a first set of functions/settings for motion classification, a second set for location classification, etc.). The API 610 is configured to receive associated functions and/or settings as input from applications 620, to convert the received inputs into a form usable by one or more associated context classifiers, and to communicate the converted inputs to the classifier(s). The API 610 is further configured to receive the resulting classification output(s) from the classifier(s) and return the output(s) to the appropriate requesting applications 620. As noted above, the API 610 and/or classifier 630 may also be configured to convert granularity settings from one form to another, such as from a granularity setting to a subset of a set of possible classification outputs, or vice versa.

While the classifier 630 shown in system 600 is a motion state classifier, other types of classifications could also be performed in a similar manner. Other examples of context classification include the following:

1) An audio based classifier, e.g., that reports number of speakers. This may have different granularities or classes outputted, e.g., coarse={no_speech, speech}, medium={no_speech, one_speaker, many_speakers}, fine={no_speech, one_speaker, two_speakers, three_speakers, etc.}.

2) A location (place) classifier, e.g., with settings including fine={home, office, meeting} and coarse={home, work}. In this example, the coarse setting may distinguish between the home and work states based on satellite positioning measurements while the fine setting may further distinguish between the office and meeting states based on additional measurements such as audio data, Wi-Fi signature data, or the like.

Additionally, other types of context classification could also be performed using the techniques described above.

Returning to FIG. 2, the context classifier 230 samples and/or otherwise obtains data corresponding to output streams provided by the data sources 210. Different streams that can be collected from the data sources 210 and used by the context classifier 230 are as follows. Other data streams and/or data types are also possible.

Audio environment: Includes batches of microphone data, each batch obtained over a specified duration, e.g., approximately one minute.

Latitude/longitude coordinates: Obtained through location fixes (e.g., from GPS or another satellite positioning system).

Wi-Fi fingerprints: Includes sets of visible Wi-Fi access points, their respective received signal strengths, e.g., given as a signal strength indication (RSSI), and their respective response rates (i.e., the fraction of the time they are visible when successive scans take place).

Bluetooth (BT) fingerprints: Includes sets of visible BT devices, their respective signal strengths (e.g., given as RSSI), their device classes, and their respective response rates.

Motion states: Includes batches of accelerometer, gyroscope and/or magnetometer data, each batch obtained over a specified duration (e.g., approximately 10-30 seconds).

Calendar events: Includes information such as event descriptions and/or titles, dates/times, locations, names of attendees and/or other associated people, etc.

Additionally, the context classifier 230 performs context classification based on low-level features and inferences obtained via the data sources 210. A list of possible low-level features that can be computed from device sensor data or external sources (such as the data sources 210) includes, but is not limited to, the following:

GPS velocity, accuracy, altitude
GPS satellites visible
Time of day, day of week, weekday/weekend, public holiday
Weather, temperature
Ambient light sensor readings
Proximity sensor readings
Camera data, intensity, R/G/B intensity, features such as DCT (discrete cosine transform) coefficients, object(s) detected in camera field of view
Closest geographic points of interest (POIs)
Bluetooth devices visible and corresponding RSSIs, new/old Bluetooth devices within range
Wi-Fi APs visible and corresponding RSSIs, new/old Wi-Fi APs visible
Ambient audio energy level
Movement detection (any device movement vs. no device movement)

Similarly, a list of possible low-level inferences that can be computed from device sensor data or external sources includes, but is not limited to, the following:

Motion state (walking, running, driving, etc.)
Device position (pocket, hand, desk, bag, etc.)
Speech detection (speech/no speech)
Speaker recognition (device owner speaking/someone else speaking)
Number of speakers present
Target sound detection (baby crying/not crying, etc.)
Zone (Home/Work/Other/In transit or Residential/Commercial, etc.)
Device usage (number of screen touches per minute, number of characters typed per minute, etc.)
Display ON vs. OFF
Application usage (type of application running (e.g. game, email, etc.), number of applications simultaneously running, etc.)

Figure 7:
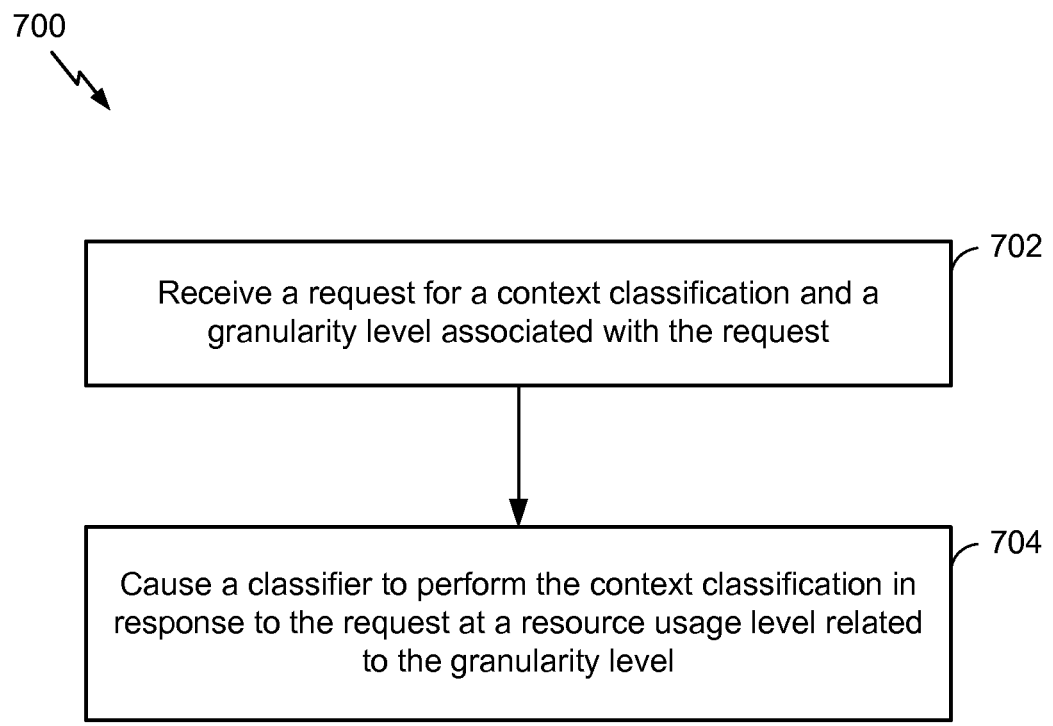
FIG. 7 is a block flow diagram of managing a context classification.

Referring to FIG. 7, with further reference to FIGS. 1-6, a process 700 of managing a context classification includes the stages shown. The process 700 is, however, an example only and not limiting. The process 700 can be altered, e.g., by having stages added, removed, rearranged, combined, and/or performed concurrently. Still other alterations to the process 700 as shown and described are possible.

At stage 702, a request for context classification, and a granularity level associated with the request, are received. Here, the request and granularity level are received at a classifier controller 240 (e.g., implemented via an API 610) from one or more classification request sources 310, such as applications 620 and/or other sources. The granularity level may be specified as a predefined granularity setting (e.g., a setting chosen from a list of allowable settings, such as the coarse and fine settings illustrated by system 600) and processed as described above with respect to system 400. Alternatively, the granularity level may correspond to a subset of a set of available classification outputs (states, context classes), as described with respect to system 500 and further described below.

At stage 704, the classifier controller 240 causes a classifier (e.g., context classifier 230) to perform the context classification in response to the request for the classification received at stage 702 at a resource usage level related to the received granularity level. The resource usage level is defined with respect to at least one of power usage, computational complexity, and/or other criteria for measuring the performance and/or efficiency of the context classifier 230. As described above, the resource level at which the context classifier 230 performs a given classification may be adjusted by varying the number of sensor features utilized, the classification technique employed and/or parameters associated with the classification technique, the duty cycle of the classifier and/or the rate at which sampling of data sources 210 is performed, or the like. In general, a higher granularity input is related to a higher resource usage level, while a lower granularity input level is related to a lower resource usage level.

Figure 8:
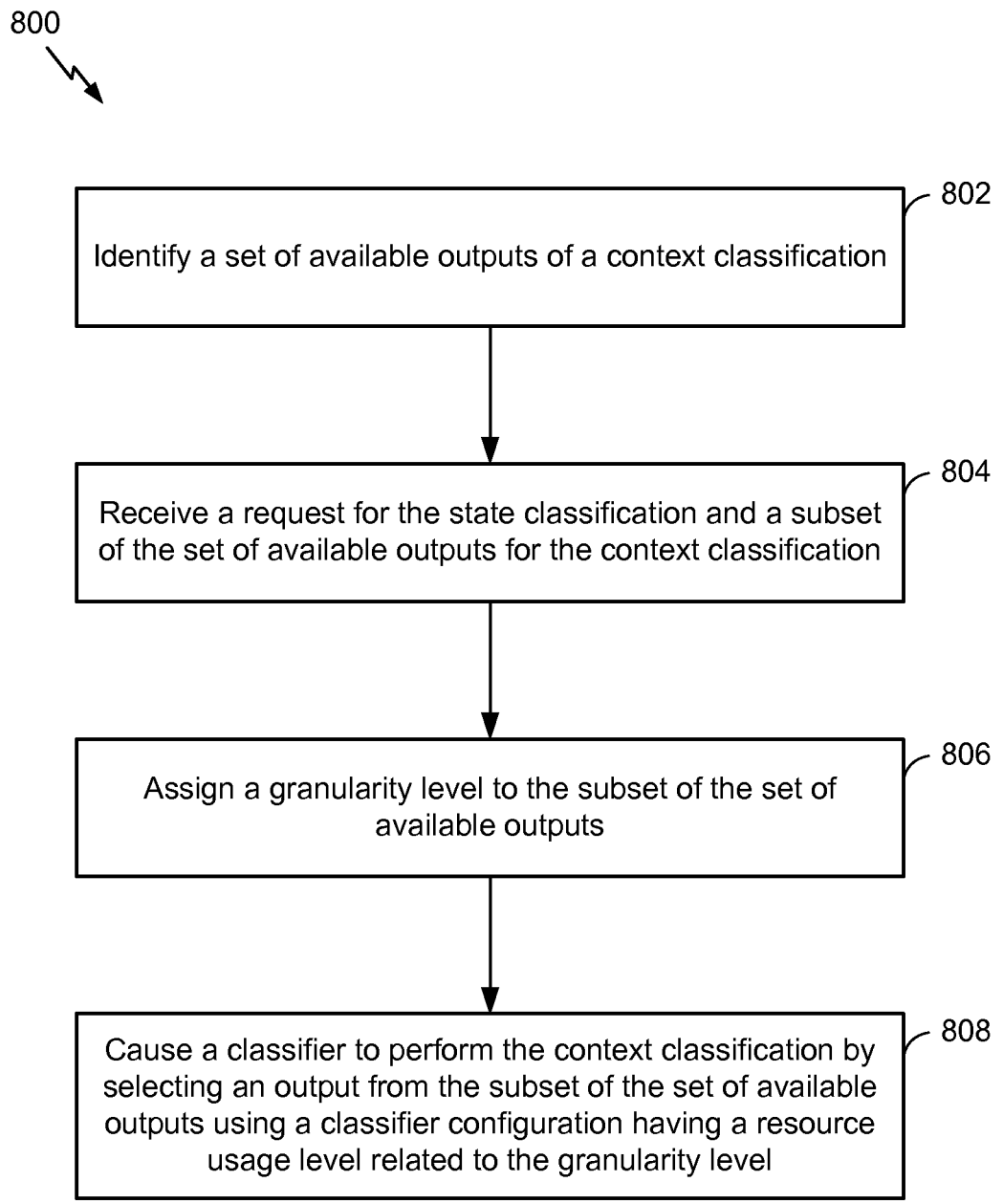
FIG. 8 is a block flow diagram of a process of managing a context classification based on a set of available classification output subsets.

Referring to FIG. 8, with further reference to FIGS. 1-6, a process 800 of managing a context classification based on a set of available classification output subsets includes the stages shown. The process 800 is, however, an example only and not limiting. The process 800 can be altered, e.g., by having stages added, removed, rearranged, combined, and/or performed concurrently. Still other alterations to the process 800 as shown and described are possible.

At stage 802, a set of available or allowable outputs of a context classification are identified, e.g., by a classifier controller 240. Respective subsets of this set of available outputs may also be formed at this stage, as described above with respect to system 500.

At stage 804, a request for a context classification is received, e.g., from an application 620 and/or another classification request source 310. The request includes a selected subset of the set of available outputs for the classification identified at stage 802. The output subset received at stage 804 is indicative of the classification outputs for which subsequent classification is to be performed—non-selected outputs may either be ignored by the classifier in its decision or grouped into other, selected outputs, as described above with respect to system 500.

At stage 806, a granularity level is assigned to the output subset indicated at stage 804. As discussed above with respect to system 500, assignment of the granularity level may be performed either by a classifier controller 240 that manages a context classifier 230 and/or the context classifier itself 230.

At stage 808, the classifier controller 240 causes the classifier (e.g., context classifier 230) to perform the context classification in response to the request for the classification received at stage 804 by selecting an output from the output subset indicated with the request at a resource usage level related to the granularity level determined at stage 806. The resource usage level is managed via similar criteria to those used at stage 704 of process 700.

Figure 9:
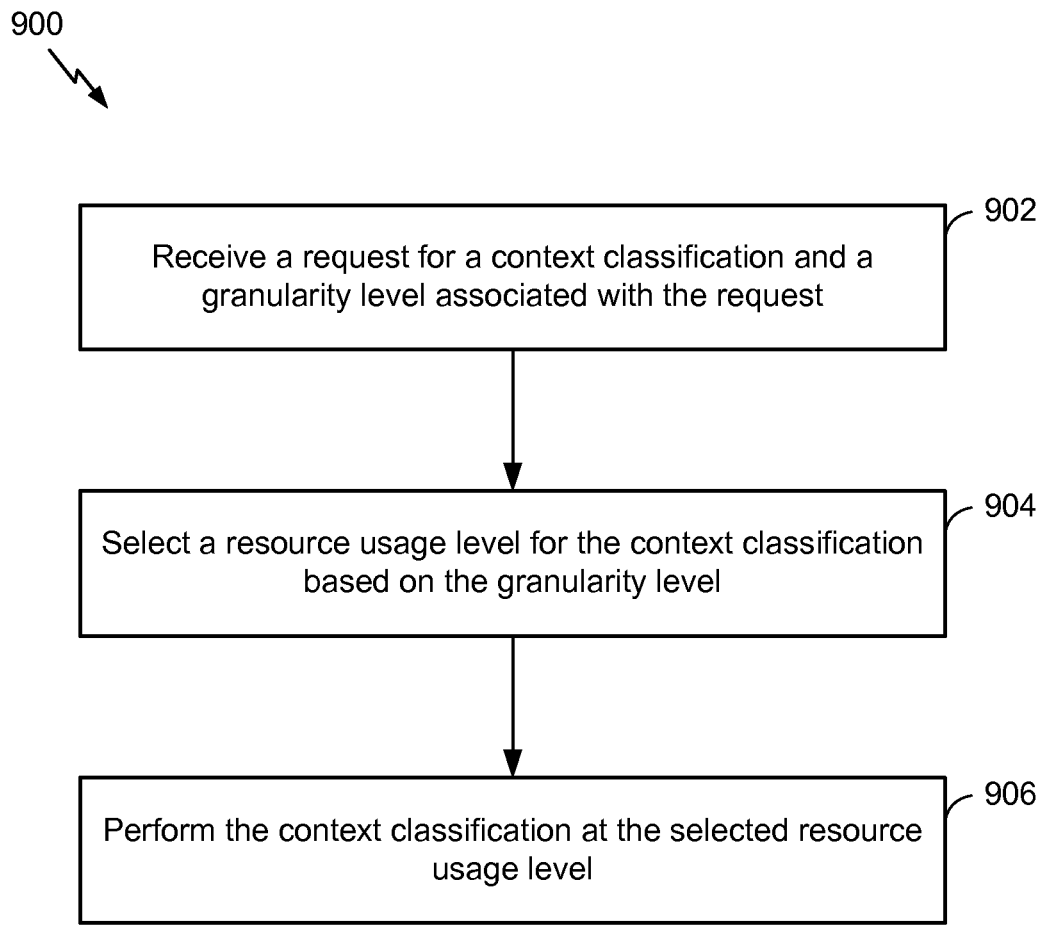
FIG. 9 is a block flow diagram of a process of performing a context classification with controllable granularity.

Referring to FIG. 9, with further reference to FIGS. 1-6, a process 900 of performing a context classification with controllable granularity includes the stages shown. The process 900 is, however, an example only and not limiting. The process 900 can be altered, e.g., by having stages added, removed, rearranged, combined, and/or performed concurrently. Still other alterations to the process 900 as shown and described are possible.

At stage 902, a request for a context classification and a granularity level associated with the request are received. Here, these inputs are received at a context classifier 230 from one or more applications 620 or classification request sources 310. The inputs are received from the sources 310 either directly or indirectly, e.g., via a classifier controller 240 (e.g., implemented as an API 610). As described above, the granularity level may correspond to a predefined granularity setting, a subset of available classification outputs (e.g., classes), and/or other information.

At stage 904, a resource usage level is selected for the context classification based on the granularity level received at stage 902. Similar to process 700 shown in FIG. 7, the resource level may be configured based on one or more criteria including, but not limited to, the number of sensor features utilized, the classification technique employed and/or parameters associated with the classification technique, the duty cycle of the classifier and/or the rate at which sampling of data sources 210 is performed, etc. In general, a higher granularity input is related to a higher resource usage level, while a lower granularity input level is related to a lower resource usage level.

At stage 906, the context classification requested at stage 902 is performed according to the resource usage level selected at stage 904. Upon completion, the result of the classification may be returned to the source of the request, either directly or indirectly (e.g., via the classifier controller 240).

Figure 10:
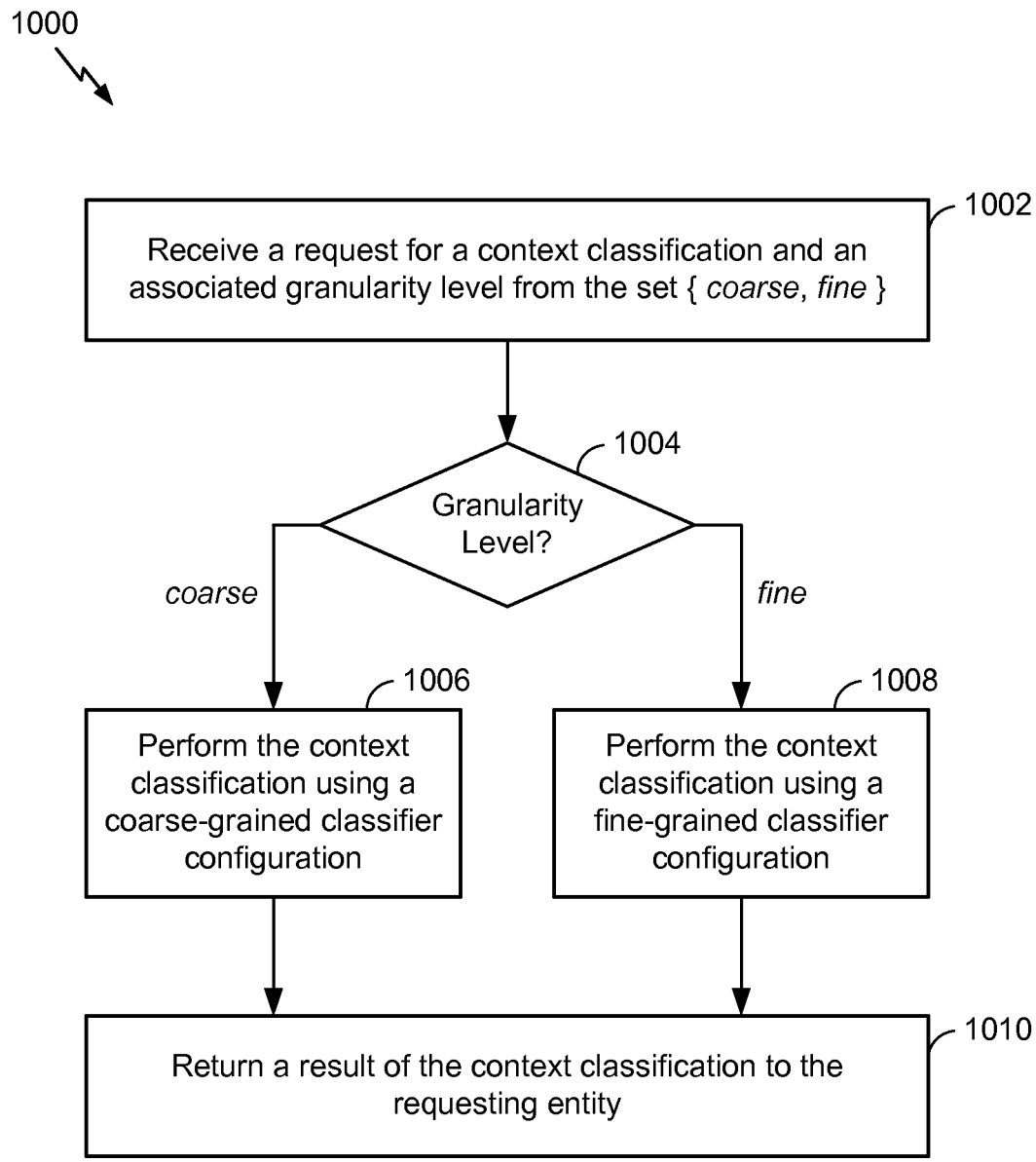
FIG. 10 is a block flow diagram of a process of performing a context classification based on predefined granularity settings.

Referring to FIG. 10, with further reference to FIGS. 1-6, a process 1000 of performing a context classification based on predefined granularity settings includes the stages shown. The process 1000 is, however, an example only and not limiting. The process 1000 can be altered, e.g., by having stages added, removed, rearranged, combined, and/or performed concurrently. Still other alterations to the process 1000 as shown and described are possible.

At stage 1002, a request for a context (state) classification is received with an associated granularity level. The granularity level is chosen from a set of predefined granularity levels that here includes the values coarse and fine. Additional and/or other settings could be used in a similar manner to that shown in process 1000.

At stage 1004, the process 1000 branches based on the value of the granularity input received at stage 1002. If the value coarse is received, the requested context classification is performed at stage 1006 using a coarse-grained classifier configuration. If the value fine is instead received, the requested context classification is performed at stage 1008 using a fine-grained classifier configuration. As described above with respect to system 400, a context classifier 230 here maintains respective sets of configuration parameters 410 corresponding to each granularity setting usable by the context classifier 230. These configuration parameters 410, in turn, define the resource usage levels of the context classifier 230 for each granularity setting. For the classifications shown at stages 1006 and 1008, the coarse-grained classifier configuration may result in a lower level of power and/or other resource usage compared to the fine-grained classifier configuration as a result of using a smaller duty cycle, a cruder classification technique, fewer classifier features, and/or other properties as compared to the fine-grained classifier configuration, as generally described above.

At stage 1010, the result of the classification performed at either stage 1006 or 1008 is returned to the requesting entity, e.g., an application 620 and/or other request source 310, an API 610 and/or classifier controller 240, etc.

Figure 11:
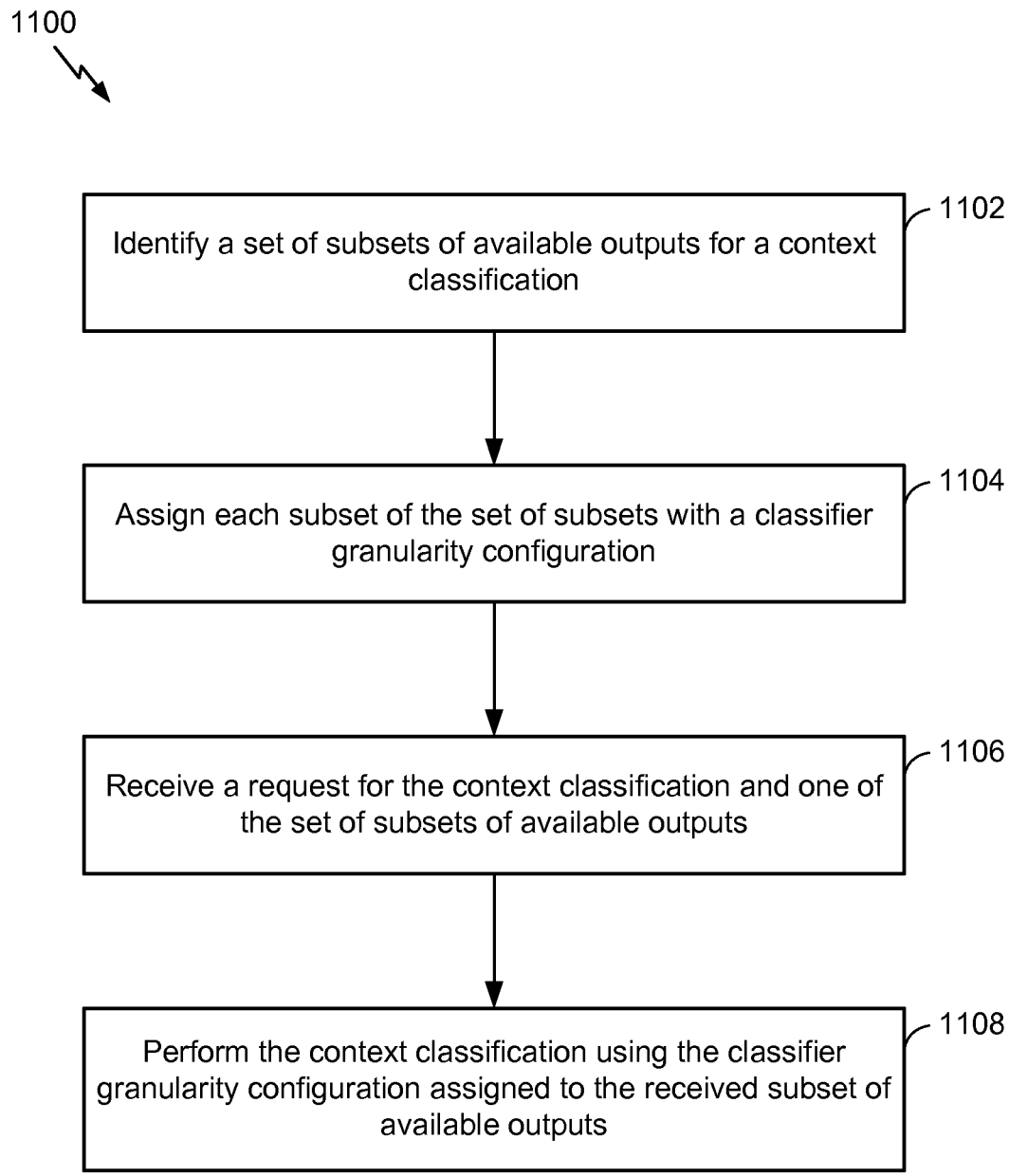
FIG. 11 is a block flow diagram of a process of performing a context classification based on a set of available classification output subsets.

Referring to FIG. 11, with further reference to FIGS. 1-6, a process 1100 of performing a context classification based on a set of available classification output subsets includes the stages shown. The process 1100 is, however, an example only and not limiting. The process 1100 can be altered, e.g., by having stages added, removed, rearranged, combined, and/or performed concurrently. Still other alterations to the process 1100 as shown and described are possible.

At stage 1102, a set of subsets of available outputs for a context classification is identified. The actions performed at stage 1102 are similar to actions performed at stage 802 of process 800 as described above, as well as the actions described with respect to system 500.

At stage 1104, each subset identified at stage 1102 is assigned to a classifier granularity configuration. These classifier granularity configurations regulate various properties of an associated context classifier 230, such as the number of sensor features utilized, the classification technique employed and/or parameters associated with the classification technique, the duty cycle of the classifier and/or the rate at which sampling of data sources 210 is performed, etc. Thus, the classifier granularity configurations assigned at stage 1104 define resource usage levels for the context classifier 230, in a manner similar to that described above with respect to stage 704 of process 700.

At stage 1106, a request for the context classification is received (e.g., at the context classifier 230 from a request source 310 or a classifier controller 240) with one of the set of subsets of available outputs for the classification, in a similar manner to the actions performed at stage 804 of process 800.

At stage 1108, the context classification requested at stage 1106 is performed using the classifier granularity configuration assigned at stage 1104 to the subset of available outputs received with the request for the classification. Here, the classification is performed by selecting an output from the received subset of available outputs that most closely characterizes sampled sensor data (e.g., data obtained from data sources 210), as described above with respect to system 500.

Figure 12:
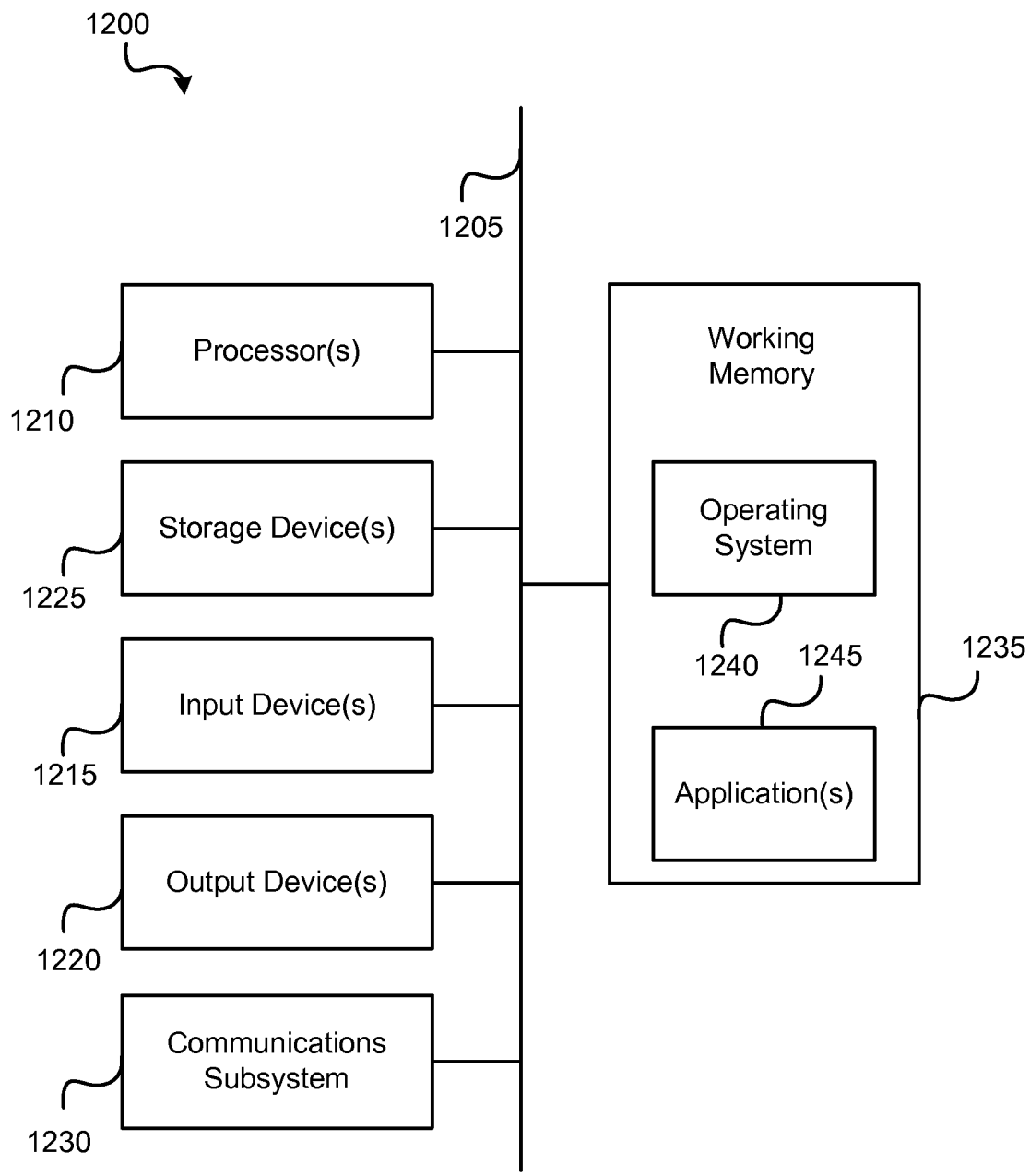
FIG. 12 is a block diagram of an example of a computer system.

A computer system 1200 as illustrated in FIG. 12 may be utilized to at least partially implement the functionality of the previously described computerized devices. For example, the computer system 1200 can be utilized to at least partially implement the processes 700, 800, 900, 1000, 1100 shown in FIGS. 7-11 in software. The computer system 1200 may also be implemented via one or more of the components of the mobile device 100 shown in FIG. 1, such as the general-purpose processor 111 and/or memory 140. The computer system 1300 may additionally or alternatively be used to provide at least a partial software implementation the system 200 shown in FIG. 2 and/or one or more of its components, such as modules 230, 240.

FIG. 12 provides a schematic illustration of one embodiment of a computer system 1200 that can perform the methods provided by various other embodiments, as described herein, and/or can function as a mobile device or other computer system. It should be noted that FIG. 12 is meant only to provide a generalized illustration of various components, any or all of which may be utilized as appropriate. FIG. 12, therefore, broadly illustrates how individual system elements may be implemented in a relatively separated or relatively more integrated manner.

The computer system 1200 is shown comprising hardware elements that can be electrically coupled via a bus 1205 (or may otherwise be in communication, as appropriate). The hardware elements may include one or more processors 1210, including without limitation one or more general-purpose processors and/or one or more special-purpose processors (such as digital signal processing chips, graphics acceleration processors, and/or the like); one or more input devices 1215, which can include without limitation a mouse, a keyboard and/or the like; and one or more output devices 1220, which can include without limitation a display device, a printer and/or the like. The processor(s) 1210 can include, for example, intelligent hardware devices, e.g., a central processing unit (CPU) such as those made by Intel® Corporation or AMD®, a microcontroller, an ASIC, etc. Other processor types could also be utilized.

The computer system 1200 may further include (and/or be in communication with) one or more non-transitory storage devices 1225, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 1200 might also include a communications subsystem 1230, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 1230 may permit data to be exchanged with a network (such as the network described below, to name one example), other computer systems, and/or any other devices described herein. In many embodiments, the computer system 1200 will further comprise a working memory 1235, which can include a RAM or ROM device, as described above.

The computer system 1200 also can comprise software elements, shown as being currently located within the working memory 1235, including an operating system 1240, device drivers, executable libraries, and/or other code, such as one or more application programs 1245, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer), and such code and/or instructions can be used to configure and/or adapt a general purpose computer (or other device) to perform one or more operations in accordance with the described methods.

A set of these instructions and/or code might be stored on a computer-readable storage medium, such as the storage device(s) 1225 described above. In some cases, the storage medium might be incorporated within a computer system, such as the system 1200. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 1200 and/or might take the form of source and/or installable code, which, upon compilation and/or installation on the computer system 1200 (e.g., using any of a variety of generally available compilers, installation programs, compression/decompression utilities, etc.) then takes the form of executable code.

Substantial variations may be made in accordance with specific desires. For example, customized hardware might also be used, and/or particular elements might be implemented in hardware, software (including portable software, such as applets, etc.), or both. Further, connection to other computing devices such as network input/output devices may be employed.

A computer system (such as the computer system 1200) may be used to perform methods in accordance with the disclosure. Some or all of the procedures of such methods may be performed by the computer system 1200 in response to processor 1210 executing one or more sequences of one or more instructions (which might be incorporated into the operating system 1240 and/or other code, such as an application program 1245) contained in the working memory 1235. Such instructions may be read into the working memory 1235 from another computer-readable medium, such as one or more of the storage device(s) 1225. Merely by way of example, execution of the sequences of instructions contained in the working memory 1235 might cause the processor(s) 1210 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 1200, various computer-readable media might be involved in providing instructions/code to processor(s) 1210 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 1225. Volatile media include, without limitation, dynamic memory, such as the working memory 1235. Transmission media include, without limitation, coaxial cables, copper wire and fiber optics, including the wires that comprise the bus 1205, as well as the various components of the communication subsystem 1230 (and/or the media by which the communications subsystem 1230 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, a Blu-Ray disc, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 1210 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1200. These signals, which might be in the form of electromagnetic signals, acoustic signals, optical signals and/or the like, are all examples of carrier waves on which instructions can be encoded, in accordance with various embodiments of the invention.

The communications subsystem 1230 (and/or components thereof) generally will receive the signals, and the bus 1205 then might carry the signals (and/or the data, instructions, etc. carried by the signals) to the working memory 1235, from which the processor(s) 1205 retrieves and executes the instructions. The instructions received by the working memory 1235 may optionally be stored on a storage device 1225 either before or after execution by the processor(s) 1210.

The methods, systems, and devices discussed above are examples. Various alternative configurations may omit, substitute, or add various procedures or components as appropriate. For instance, in alternative methods, stages may be performed in orders different from the discussion above, and various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

As used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A method for managing a context classification, the method comprising:
receiving a request for the context classification and a granularity input associated with the request, wherein the granularity input indicates a granularity level of a context classification output to identify a subset of available states from which the context classification output is selected, with the subset of available states comprising a number of states determined based on the granularity level indicated by the granularity input, and to determine which data features are collected from data sources to select the context classification output, with the determined data features comprising a number of data features determined based on the granularity level indicated by the granularity input such that fewer data features are used for classification when a first granularity level is indicated than when a second granularity level, larger than the first granularity level, is indicated;
selecting a configuration parameter, from a plurality of configuration parameters, for the context classification based on the granularity input, the plurality of configuration parameters comprising different values for different granularity levels indicated by the granularity input; and
performing, by a classifier, the context classification according to the granularity input, indicating the granularity level of the context classification output, in response to the request by classifying data of the data features collected from the data sources using the selected configuration parameter for the context classification;
wherein a configuration parameter for a granularity input indicating a high granularity level is associated with a high resource usage level and a configuration parameter for a granularity input indicating a low granularity level is associated with a low resource usage level.

2. The method of claim 1 further comprising:
obtaining the context classification output from the classifier; and
forwarding the context classification output to an entity from which the request was received.

3. The method of claim 1 wherein the selected configuration parameter comprises at least one of a number of sensor features utilized, or a duty cycle of the classifier.

4. The method of claim 1 wherein the granularity input is selected from a predefined set of granularity settings.

5. The method of claim 1 further comprising:
identifying subsets of available outputs for the context classification; and
assigning granularity levels to respective ones of the subsets of available outputs for the context classification.

6. The method of claim 5 wherein:
the receiving comprises receiving the granularity input comprising one of the subsets of available outputs for the context classification; and
the performing comprises performing, by the classifier, the context classification by selecting the context classification output from the one of the subsets of available outputs for the context classification received as the granularity input.

7. The method of claim 1 wherein the context classification comprises one or more of a motion state classification, a location state classification, or an audio state classification.

8. The method of claim 1 wherein the receiving comprises receiving, at an application programming interface (API), the request for the context classification from a requesting application.

9. The method of claim 1 wherein the selected configuration parameter comprises a number of classifier model parameters, the number of the classifier model parameters being lower for the low granularity level than for the high granularity level.

10. The method of claim 9 wherein the classifier model parameters comprise at least one of mixture components for a Gaussian Mixture Model, support vectors for a Neural Network classifier, or data points for a nearest neighbor classifier.

11. The method of claim 1, wherein the subset of available states comprises the number of states determined based on the granularity level indicated by the granularity input such that the subset of available states has fewer states when the first granularity level is indicated than when the second granularity level, larger than the first granularity level, is indicated.

12. The method of claim 1, wherein the classifier is a Gaussian Mixture Model-based motion state classifier;

wherein when the granularity level corresponds to a coarse granularity level, the subset of available states includes three states comprising a stationary state, a pedestrian motion state, and a vehicular motion state, and the data features comprise standard deviation of an accelerometer norm, and a ratio of means, with one mixture component per feature;

and wherein when the granularity level corresponds to a fine granularity level, the subset of available states includes seven states comprising a walk state, a run state, a sit state, a stand state, a fiddle state, a rest state, and a drive state, and the data features comprise the standard deviation of an accelerometer norm, the ratio of means, pitch and roll, multiple mel-frequency cepstral coefficients (MFCCs), spectral entropy, and a mean of the accelerometer norm, with four mixture components per feature.

13. A method for performing a context classification with adjustable granularity, the method comprising:

receiving a request for the context classification and a granularity input associated with the request, wherein the granularity input indicates a granularity level of a context classification output to identify a subset of available states from which the context classification output is selected, with the subset of available states comprising a number of states determined based on the granularity level indicated by the granularity input, and to determine which data features are collected from data sources to select the context classification output, with the determined data features comprising a number of data features determined based on the granularity level indicated by the granularity input such that fewer data features are used for classification when a first granularity level is indicated than when a second granularity level, larger than the first granularity level, is indicated;

selecting a configuration parameter, from a plurality of configuration parameters, for the context classification based on the granularity input, the plurality of configuration parameters comprising different values for different granularity levels indicated by the granularity input, wherein a configuration parameter for a granularity input indicating a high granularity level is associated with a high resource usage level and a configuration parameter for a granularity input indicating a low granularity level is associated with a low resource usage level; and performing the context classification according to the granularity input, indicating the granularity level of the context classification output, by classifying data of the data features collected from the data sources using the selected configuration parameter for the context classification.

14. The method of claim 13 wherein the selected configuration parameter comprises at least one of a number of sensor features utilized or a frequency of classification.

15. The method of claim 13 wherein the granularity input is selected from a predefined set of granularity settings.

16. The method of claim 15 wherein the selecting the configuration parameter for the context classification comprises:

obtaining sets of classifier configuration parameters, wherein respective ones of the sets of classifier configuration parameters indicate assignments between resource usage levels and corresponding ones of the predefined set of granularity settings; and selecting as the configuration parameter for the context classification the set of classifier configuration parameters assigned to the received granularity input.

17. The method of claim 13 further comprising:
identifying subsets of available outputs for the context classification; and assigning respective ones of the subsets of available outputs for the context classification to respective classifier granularity configurations, wherein the classifier granularity configurations define corresponding resource usage levels.

18. The method of claim 17 wherein:
the receiving comprises receiving the granularity input comprising one of the subsets of available outputs for the context classification; and performing the context classification comprises performing the context classification using a classifier granularity configuration assigned to the one of the subsets of available outputs for the context classification received as the granularity input.

19. The method of claim 13 wherein the context classification comprises one or more of a motion state classification, a location state classification, or an audio state classification.

20. The method of claim 13 wherein the receiving comprises receiving the request for context classification and the granularity input from an application programming interface (API).

21. The method for claim 20 further comprising returning an output of the context classification to the API.

22. The method of claim 20, wherein:
the request for the context classification originates from a requesting application; and the method further comprises returning the context classification output to the requesting application.

23. An apparatus for performing context classification with adjustable granularity, the apparatus comprising:
a memory; and
a processor communicatively coupled to the memory, the processor comprising:

a classifier controller configured to receive a request for the context classification and a granularity input associated with the request, wherein the granularity input indicates a granularity level of a context classification output to identify a subset of available states from which the context classification output is selected, with the subset of available states comprising a number of states determined based on the granularity level indicated by the granularity input, and to determine which data features are collected from data sources to select the context classification output, with the determined data features comprising a number of data features determined based on the granularity level indicated by the granularity input such that fewer data features are used for classification when a first granularity level is indicated than when a second granularity level, larger than the first granularity level, is indicated; and a context classifier communicatively coupled to the classifier controller and configured to:
receive the request and the granularity input from the classifier controller, select a configuration parameter, from a plurality of configuration parameters, for the context classification based on the granularity input, the plurality of configuration parameters comprising different values for different granularity levels indicated by the granularity input, wherein a configuration parameter for a granularity input indicating a high granularity level is associated with a high resource usage level and a configuration parameter for a granularity input indicating a low granularity level is associated with a low resource usage level, perform the context classification according to the granularity input, indicating the granularity level of the context classification output, by classifying data of the data features collected from the sources using the selected configuration parameter for the context classification, and output the context classification output.

24. The apparatus of claim 23 wherein the classifier controller is further configured to obtain the context classification output from a classifier and to forward the context classification output to an entity from which the request was received.

25. The apparatus of claim 23 wherein the selected configuration parameter comprises at least one of a number of sensor features utilized or a duty cycle of a classifier.

26. The apparatus of claim 23 wherein the granularity input is selected from a predefined set of granularity settings.

27. The apparatus of claim 26 wherein the context classifier is further configured to:

obtain sets of classifier configuration parameters, wherein respective ones of the sets of classifier configuration parameters indicate assignments between resource usage levels and corresponding ones of the predefined set of granularity settings, and select as the selected configuration parameter for the context classification the set of classifier configuration parameters assigned to the received granularity input.

28. The apparatus of claim 23 wherein the granularity input comprises a subset of available outputs for the context classification.

29. The apparatus of claim 28 wherein the context classifier is further configured to assign the subset of the available outputs for the context classification received as the granularity input to a classifier granularity configuration, the classifier granularity configuration defining a corresponding resource usage level.

30. The apparatus of claim 29 wherein the context classifier is further configured to perform the context classification by selecting the context classification output from the subset of available outputs received as the granularity input.

31. The apparatus of claim 23 wherein the context classifier comprises one or more of a motion state classifier, a location state classifier, or an audio state classifier.

32. The apparatus of claim 23 wherein the classifier controller comprises an application programming interface (API) and is further configured to receive the request for the context classification from a requesting application.

33. The apparatus of claim 32 wherein the context classifier is further configured to provide the context classification output to at least one of the API or the requesting application.

34. The apparatus of claim 23 further comprising one or more of the data sources communicatively coupled to the context classifier, wherein the context classifier is configured to perform the context classification based on the data sampled from the one or more of the data sources.

35. The apparatus of claim 34 wherein the one or more of the data sources comprise at least one of an audio sensor, a location sensor, a network sensor, a motion sensor, a calendar, a clock, a set of device usage statistics, or a light sensor.

36. An apparatus for managing a context classification, the apparatus comprising:

means for receiving a request for the context classification and a granularity input associated with the request, wherein the granularity input indicates a granularity level of a context classification output to identify a subset of available states from which the context classification output is selected, with the subset of available states comprising a number of states determined based on the granularity level indicated by the granularity input, and to determine which data features are collected from data sources to select the context classification output, with the determined data features comprising a number of data features determined based on the granularity level indicated by the granularity input such that fewer data features are used for classification when a first granularity level is indicated than when a second granularity level, larger than the first granularity level, is indicated; and means for selecting a configuration parameter, from a plurality of configuration parameters, for the context classification based on the granularity input, the plurality of configuration parameters comprising different values for different granularity levels indicated by the granularity input; and means for performing the context classification according to the granularity input, indicating the granularity level of the context classification output, in response to the request by classifying data of the data features collected from the data sources using the selected configuration parameter for the context classification;

wherein a configuration parameter for a granularity input indicating a high granularity level is associated with a high resource usage level and a configuration parameter for a granularity input indicating a low granularity level is associated with a low resource usage level.

37. The apparatus of claim 36 wherein the selected configuration parameter comprises at least one of a number of sensor features utilized or a duty cycle of a classifier.

38. The apparatus of claim 36 wherein the granularity input is selected from a predefined set of granularity settings.

39. The apparatus of claim 36 wherein the granularity input comprises a subset of available outputs for the context classification.

40. The apparatus of claim 36 wherein the context classification comprises one or more of a motion state classification, a location state classification, or an audio state classification.

41. An apparatus for performing a context classification with adjustable granularity, the apparatus comprising:

means for receiving a request for the context classification and a granularity input associated with the request, wherein the granularity input indicates a granularity level of a context classification output to identify a subset of available states from which the context classification output is selected, with the subset of available states comprising a number of states determined based on the granularity level indicated by the granularity input, and to determine which data features are collected from data sources to select the context classification output, with the determined data features comprising a number of data features determined based on the granularity level indicated by the granularity input such that fewer data features are used for classification when a first granularity level is indicated than when a second granularity level, larger than the first granularity level, is indicated;

means for selecting a configuration parameter, from a plurality of configuration parameters, for the context classification based on the granularity input, the plurality of configuration parameters comprising different values for different granularity levels indicated by the granularity input, wherein a configuration parameter for a granularity input indicating a high granularity level is associated with a high resource usage level and a configuration parameter for a granularity input indicating a low granularity level is associated with a low resource usage level; and means for performing the context classification according to the granularity input, indicating the granularity level of the context classification output, by classifying data of the data features collected from the data sources using the selected configuration parameter for the context classification.

42. The apparatus of claim 41 wherein the selected configuration parameter comprises at least one of a number of sensor features utilized or a frequency of classification.

43. The apparatus of claim 41 wherein the granularity input is selected from a predefined set of granularity settings.

44. The apparatus of claim 41 wherein the granularity input comprises a subset of available outputs for the context classification.

45. The apparatus of claim 41 wherein the context classification comprises one or more of a motion state classification, a location state classification, or an audio state classification.

46. The apparatus of claim 41 further comprising means for returning the context classification output to a source of the request for the context classification.

47. A computer program product residing on a non-transitory processor-readable computer storage medium, the computer program product comprising processor-executable instructions configured to cause a processor to:

receive a request for the context classification and a granularity input associated with the request, wherein the granularity input indicates a granularity level of a context classification output to identify a subset of available states from which the context classification output is selected, with the subset of available states comprising a number of states determined based on the granularity level indicated by the granularity input, and to determine which data features are collected from data sources to select the context classification output, with the determined data features comprising a number of data features determined based on the granularity level indicated by the granularity input such that fewer data features are used for classification when a first granularity level is indicated than when a second granularity level, larger than the first granularity level, is indicated;

select a configuration parameter, from a plurality of configuration parameters, for the context classification based on the granularity input, the plurality of configuration parameters comprising different values for different granularity levels indicated by the granularity input; and perform, by a classifier, the context classification according to the granularity input, indicating the granularity level of the context classification output, in response to the request by classifying data of the data features collected from the data sources using the selected configuration parameter for the context classification;

wherein a configuration parameter for a granularity input indicating a high granularity level is associated with a high resource usage level and a configuration parameter for a granularity input indicating a low granularity level is associated with a low resource usage level.

48. The computer program product of claim 47 wherein the selected configuration parameter comprises at least one of a number of sensor features utilized or a duty cycle of the classifier.

49. The computer program product of claim 47 wherein the granularity input is selected from a predefined set of granularity settings.

50. The computer program product of claim 47 wherein the granularity input comprises a subset of available outputs for the context classification.

51. A computer program product residing on a non-transitory processor-readable computer storage medium, the computer program product comprising processor-executable instructions configured to cause a processor to:

receive a request for a context classification and a granularity input associated with the request, wherein the granularity input indicates a granularity level of a context classification output to identify a subset of available states from which the context classification output is selected, with the subset of available states comprising a number of states determined based on the granularity level indicated by the granularity input, and to determine which data features are collected from data sources to select the context classification output, with the determined data features comprising a number of data features determined based on the granularity level indicated by the granularity input such that fewer data features are used for classification when a first granularity level is indicated than when a second granularity level, larger than the first granularity level, is indicated;

select a configuration parameter, from a plurality of configuration parameters, for the context classification based on the granularity input, the plurality of configuration parameters comprising different values for different granularity levels indicated by the granularity input, wherein a configuration parameter for a granularity input indicating a high granularity level is associated with a high resource usage level and a configuration parameter for a granularity input indicating a low granularity level is associated with a low resource usage level; and perform the context classification according to the granularity input, indicating the granularity level of the context classification output, by classifying data of the data features collected from the data sources using the selected configuration parameter for the context classification.

52. The computer program product of claim 51 wherein the selected configuration parameter comprises at least one of a number of sensor features utilized or a frequency of classification.

53. The computer program product of claim 51 wherein the granularity input is selected from a predefined set of granularity settings.

54. The computer program product of claim 51 wherein the granularity input comprises a subset of available outputs for the context classification.

55. The computer program product of claim 51 further comprising instructions configured to cause the processor to return the context classification output to a source of the request for the context classification.

* * * * *